United States Patent Office 3,503,131
Patented Mar. 31, 1970

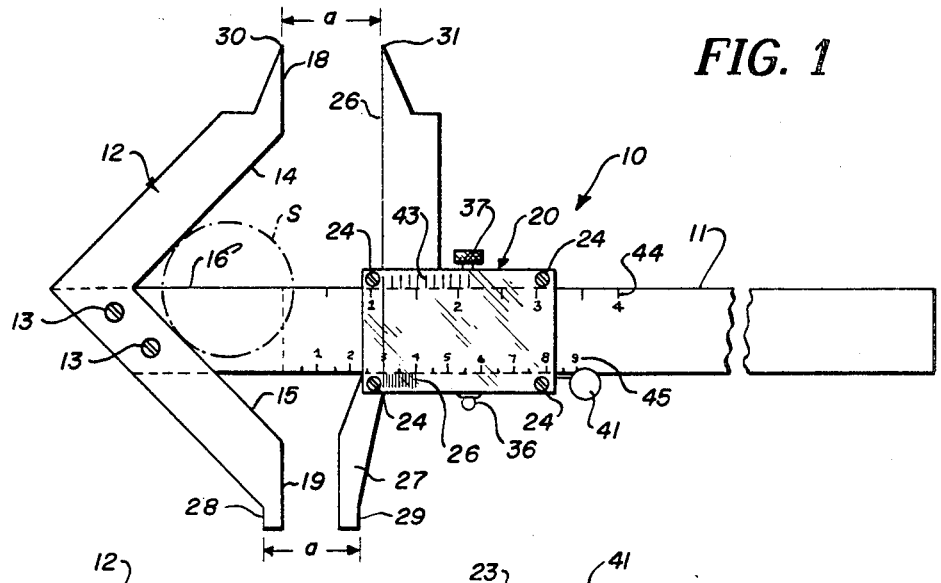

3,503,131
MULTIPURPOSE INSTRUMENT
Louis A. Warner, 5223 N. Natoma,
Chicago, Ill. 60656
Filed Jan. 27, 1969, Ser. No. 794,024
Int. Cl. G01b 5/02, 5/14
U.S. Cl. 33—143                        6 Claims

ABSTRACT OF THE DISCLOSURE

A multipurpose instrument which is adapted for use as a sliding caliper for measuring inside and outside dimensions, a divider, a compass, a circular cutter, a T-square and a center finder for circular stock.

---

This invention relates, in general, to improved sliding calipers. More particularly, it relates to an improved multipurpose device or instrument which is adapted for use as a sliding caliper for measuring inside and outside dimensions, a divider, a compass, a circular cutter, a T-square and a center finder for circular stock, to mention but a few of its many uses.

Numerous different sliding calipers presently are available, however, most of them are adapted to only measure inside and outside dimensions. Some do have devices on them for measuring the depth of various objects, and still others have various different types of scales on them for performing mathematical computations, however, other than for these minor distinctions, they are all generally of the same construction. In other words, the majority, if not all of them, are single purpose devices.

The cost of manufacturing, and hence the purchase price of these calipers, had increased substantially in the last few years, as has the cost of the other instruments such as dividers, circle cutters, T-squares and the like used by engineers, draftsmen, mold makers, tool and die workers and men in other similar occupations. In view of these cost increases, there presently is a considerable demand for multipurpose, as opposed to single purpose, instruments, such as the multipurpose instrument of the present invention.

Accordingly, an object of the present invention is to provide an improved multipurpose device or instrument.

More particularly, an object is to provide an improved multipurpose device or instrument which can be easily manufactured and which can be sold at a price which is competitive with the price normally paid for a device capable of performing only one of its many uses.

More particularly still, an object is to provide an improved multipurpose device or instrument of the above type which is adaptable for use as a caliper to measure both inside and outside dimensions, a divider, a compass, a circular cutter, a T-square and a center finder for circular stock, to mention but a few of its many uses.

Other objects of the invention will in part be obvious and will in part appear hereinafter.

The invention accordingly comprises an article of manufacture possessing the features, properties, and the relation of elements which will be exemplified in the article hereinafter described, and the scope of the invention will be indicated in the claims.

For a fuller understanding of the nature and objects of the invention, reference should be had to the following detailed description taken in connection with the accompanying drawing, in which:

FIG. 1 is a top plan view of a multipurpose device or instrument exemplary of the present invention;

FIG. 2 is a partial top plan view of the multipurpose instrument of FIG. 1;

FIG. 3 is a partial rear view of the multipurpose instrument of FIG. 1, illustrating the locking mechanism and the thumb wheel arrangement for positioning the slider thereof;

FIG. 4 is an exploded perspective view of the slider of the multipurpose instrument of FIG. 1; and FIG. 5 is a view generally illustrating the manner in which the multipurpose instrument can be used as a T-square.

Similar reference characters refer to similar parts throughout the several views of the drawing.

Referring now to the drawing, in FIG. 1 there is shown a multipurpose instrument 10 which includes an elongated generally rectangular-shaped bar 11 which has an L-shaped arm 12 fixedly secured to its one end, by means of fastener means 13 which can be threaded screws, rivets or the like. The edges 14 and 15 of the L-shaped arm 12 form a right angle and the L-shaped arm is affixed to the bar 11 so that its upper edge 16 bisects the right angle formed by these two edges 14 and 15. The L-shaped arm 12 is formed from stock material having a substantial thickness, preferably approximately ⅛ inch, so that it is relatively rigid and so that the edges 14 and 15 thereof form shoulders against which circular bar stock such as the circular bar stock S illustrated in dotted lines can abut. This construction of the L-shaped arm 12 and the bar 11 forms a center finder for circular stock and the like, since the upper edge 16 of the bar 11 extends through the center axis of the circular bar stock when it is abutted against the edges 14 and 15 of the L-shaped arm 12, as illustrated in FIG. 1. A pair of lines can be scribed on the end of the circular stock S, using the upper edge 16 of the bar 11, and the intersection of these lines, of course, is the center axis of the circular bar stock. Accordingly, by constructing the multipurpose instrument 10 in this manner, the need to purchase or otherwise acquire a center finder is eliminated.

The edges 18 and 19 formed on the L-shaped arm 12 are flat edges and are in alignment with one another so that the bar 11 and the L-shaped arm 12 affixed to it can be used as a T-square, as illustrated in FIG. 5. Accordingly, simply by removing the slide 20, described below, from the bar 11 of the multipurpose instrument 10, a T-square is provided.

The slide 20, as can be best seen in FIG. 4, includes a body portion 22 having an offset connector portion 21 which is offset sufficiently so that the bar 11 can be received therein, and face plate 23 affixed to the body portion 22, by means of fastener means 24 which can be threaded screws or the like. The face plate 23 is of a transparent material preferably clear Lucite or the like which is not subject to breakage. The body portion 22 of the slide 20 has an arm 25 and an edge 26 of the latter extends parallel to the edges 18 and 19 of the L-shaped arm 12. Another arm 27 extends from the body portion 22 in the opposite direction to the arm 25. This arm has an edge 29 which is parallel to an edge 28 formed on the L-shaped arm 12. The edge 18 on the L-shaped arm 12 and the edge 26 on the arm 25 of the slide 20 are used to measure outside dimensions, and the edge 28 on the L-shaped member 12 and the edge 29 on the arm 27 of the slide 20 are used to measure inside dimensions. The face plate 23 has a hairline 42 on it which cooperates with scales 44 and 45 on the bar 11 to provide both the inside and outside dimensions of the objects being measured. It may be noted that the arrangement is such that the dimensions $a$ indicated on FIG. 1 are the same and both are indicated by the same hairline 42 on the face plate 23.

Pointed tips 30 and 31 advantageously are provided on the end of the arm 25 and the corresponding end of the L-shaped arm 12, as illustrated in FIG. 1. These pointed tips can be used in the manner in which a divider of a compass is used and, furthermore, since the L-shaped arm 12 and the slide 20 are formed of a relatively rigid material, these pointed tips 30 and 31 can be used as a circle cutter. Accordingly, it can be seen that the multipurpose instrument 10 replaces at least three other instruments which are normally used by various craftsmen.

The body portion 22 of the slide 20 has a pair of spaced apart flanges 32 and 33, and these flanges have an aperture 34 in them for receiving a pin 35 (FIGS. 2 and 3) which functions to secure the slide 20 to the bar 11 and to lock the slide 20 in a fixed position on the bar 11. As can best be seen in FIG. 3, the pin 35 has a stop 36 on its one end and its opposite end is threaded to receive a knob 37. A spring 38 is disposed behind the pin 35 in sliding engagement with the bar 11 to fixedly and slidably secure the slide 20 to the bar 11. Another spring 39 is disposed between the flange 32 and the upper edge 16 of the bar 11, and this spring has an eyelet 40 formed on its one end for rotatably receiving a thumb wheel 41. The spring 39 has an aperture (not shown) in it through which the pin 35 extends to retain the spring in position. The thumb wheel 41 has a groove in its peripheral edge for receiving therein the edge of the bar 11. The spring 39 forcibly urges the thumb wheel 41 against the edge of the bar 11, and by rotating the thumb wheel 41, the slide 20 can be slidably positioned along the length of the bar 11. To fixedly and releasably lock the slide 20 in a pre-established position, the knob 37 is rotated and this action forcibly urges the spring 39 downwardly so that the bar 11 is forcibly gripped between the spring 39 and the flange 33.

As indicated above, the face plate 23 affixed to the body portion 22 of the slide 20 has a hairline 42 on it which cooperates with a pair of scales 44 and 45 on the bar 11. In the illustrated example, the scale 44 is an inch scale calibrated in $\frac{1}{10}$ inches. A vernier scale 43 also is provided on the face plate 23, in cooperative relationship with the inch scale 44 so that more accurate measurements can be made, in the well-known fashion. The scale 45, in the illustrated case, is calibrated in millimeters, and the face plate 23 likewise has a vernier scale on it, in cooperative relationship with this millimeter scale. Accordingly, with the illustrated arrangement, relatively accurate measurements in inches or millimeters can be provided.

From the above description, it can be seen that the multipurpose instrument 10 can be easily manufactured, at a cost which is competitive with the price normally paid for a device capable of performing only one of its many uses. As indicated above, the bar 11 in combination with the L-shaped arm 12 permits the instrument 10 to be used as a center finder for circular bar stock or other similar objects, and as a T-square. The pointed tips 30 and 31 on the end of the arm 25 and the corresponding end of the L-shaped arm 12 permit the instrument 10 to be used as a divider, a compass or a circle cutter. The edges 28 and 29 and the edges 18 and 26 permit the instrument 10 to be used as a caliper for measuring inside and outside dimensions, respectively. Accordingly, it can be seen that the multipurpose instrument 10 can be used to replace at least six separate instruments normally used by various craftsmen.

It will thus be seen that the objects set forth above, among those made apparent from the preceding description, are efficiently attained and, since certain changes may be made in the above article without departing from the scope of the invention, it is intended that all matter contained in the above description or shown in the accompanying drawings shall be interpreted as illustrative and not in a limiting sense.

Now that the invention has been described, what is claimed as new and desired to be secured by Letters Patent is:

1. A multipurpose instrument comprising an elongated generally rectangular-shaped caliper bar having a generally L-shaped member fixedly secured to its one end, said L-shaped member having two arms which form a right angle and said caliper bar being affixed to said L-shaped member such that said right angle is bisected by the upper edge of said caliper bar, said two arms and said caliper bar thereby forming a center finder for circular objects, the ends of said two arms of said L-shaped member being formed to provide flat edges which are aligned with one another and disposed perpendicular to said upper end of said caliper bar whereby said caliper bar with said L-shaped member affixed to it forms a T-square, a slide slidably adjustably affixed to said caliper bar having a first arm having one edge thereof disposed parallel to said flat edge on the end of one of said two arms of said L-shaped member, at least one scale on said caliper bar, a hairline on said slide cooperatively arranged with said scale and with the edge of said slide's first arm and said flat edge disposed parallel to it to provide a measurement of an object disposed between and engaged by said slide's first arm and said flat edge disposed parallel to it whereby a caliper for measuring outside dimensions of objects is provided, said slide having a second arm having a flat edge on it, the end of the other one of said two arms of said L-shaped member having a flat edge disposed parallel to said flat edge of said slide's second arm, said hairline also being cooperatively arranged with said scale and with the flat edge of said slide's second arm and said flat edge disposed parallel to it to provide inside measurements of objects with which said flat edges are engaged whereby a caliper for measuring outside dimensions of objects is provided.

2. The multipurpose instrument of claim 1 wherein pointed tips are formed on the end of said first arm of said slide and on the end of the arm of said L-shaped member which is adjacent it, whereby said instrument can function as a divider, a compass or a circle cutter.

3. The multipurpose instrument of claim 1 wherein said slide comprises a body portion having said two arms integrally formed with it and a transparent face plate which is fixedly secured to said body portion, said body portion being formed to slidably receive said caliper bar between it and said face plate, said face having said hairline formed on it.

4. The multipurpose instrument of claim 3, wherein said face plate has at least one vernier scale on it in cooperative relationship with said scale on said caliper bar.

5. The multipurpose instrument of claim 3, further including a thumb wheel resiliently and rotatably supported from said slide so as to forcibly bear against the edge of said caliper bar whereby rotating said thumb wheel slidably positions said slide.

6. The multipurpose instrument of claim 5 further including lock means affixed to said slide for releasably locking said slide to said caliper bar.

References Cited

UNITED STATES PATENTS

| | | | |
|---|---|---|---|
| 1,296,720 | 3/1919 | Verwys | 33—95 |
| 2,515,214 | 7/1950 | Goldberg. | |

SAMUEL S. MATTHEWS, Primary Examiner

U.S. Cl. X.R.

33—95, 112